Patented Aug. 7, 1945

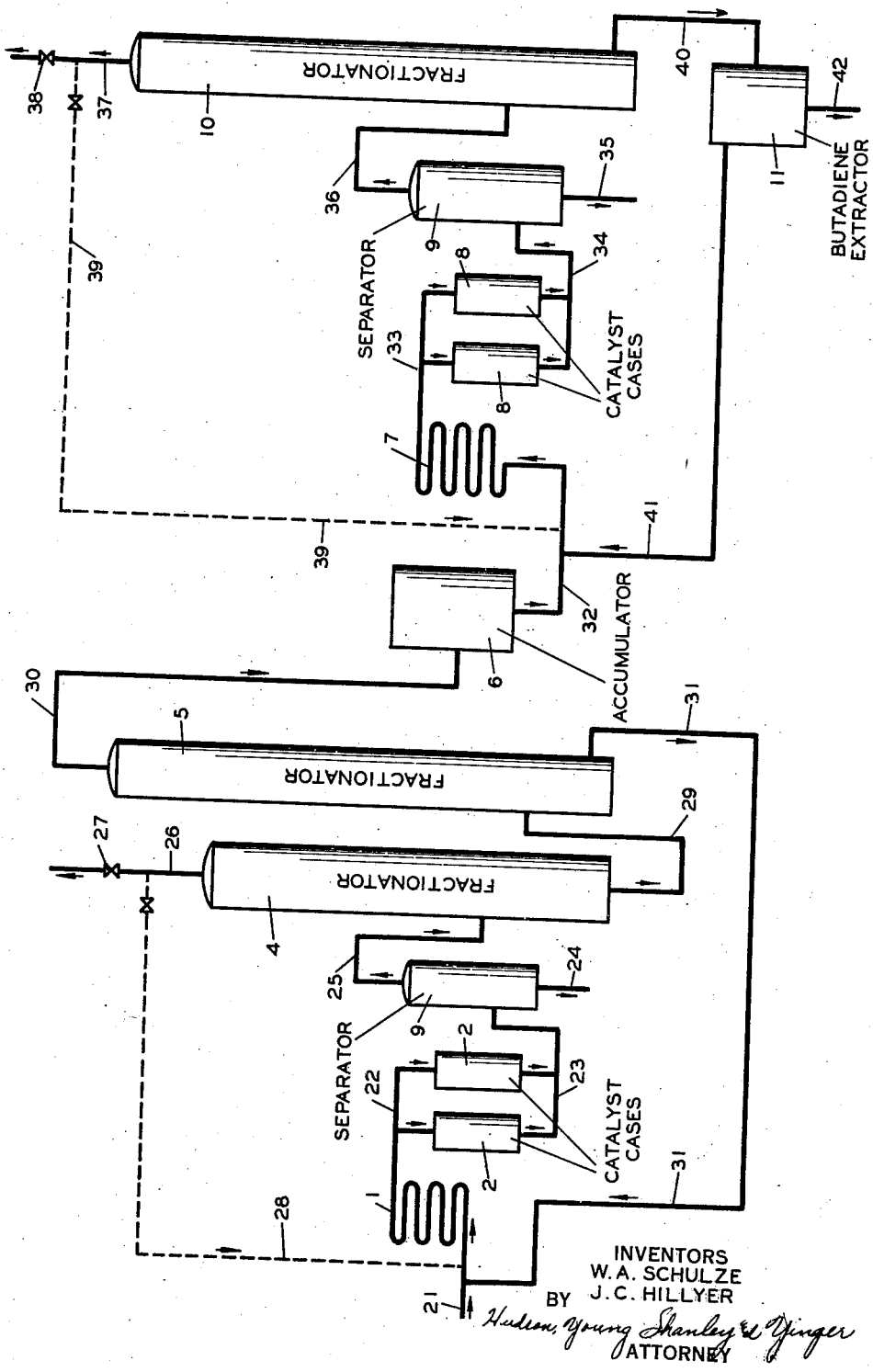

2,381,692

UNITED STATES PATENT OFFICE 2,381,692

PROCESS FOR THE DEHYDROGENATION OF HYDROCARBONS

Walter A. Schulze and John C. Hillyer, Bartlesville, Okla., assignors to Phillips Petroleum Company, a corporation of Delaware Application August 15, 1940, Serial No. 352,787

2 Claims. (Cl. 260—680)

This invention relates to the treatment of normal butane to produce the valuable diolefinic hydrocarbon butadiene, and relates more particularly to improved catalytic methods of dehydrogenating butane in successive stages to produce butenes and butadiene, respectively.

In a more specific sense one of the objects of this invention is an improved process for preparing butadiene in which butenes are first prepared by catalytic dehydrogenation of normal butane or of a C₄ hydrocarbon charge stock. A further object of the invention is an improved process whereby butene-1, separated from the dehydrogenation products by fractional distillation is further dehydrogenated to butadiene with a minimum of loss due to polymerization, cracking and other side reactions occurring concurrently with dehydrogenation.

It has already been proposed to dehydrogenate normal butane catalytically to produce a mixture of butenes which may then be used for further dehydrogenation to butadiene, if desired. When using catalysts, such as synthetic alumina, magnesia, zinc oxide, various mineral catalysts such as bauxite, and the like, relatively high temperatures are necessary to achieve conversions to butenes which are considered economically feasible. Thus, when using alumina, temperatures of the order of 1100° F. are ordinarily employed. The other catalysts named are also usually employed at the same temperature level. These catalysts, are not sufficiently active to give dehydrogenation equal to the calculated equilibrium values in the contact times employed, and increased contact times are not favorable because of an accompanying increase in the extent of decomposition reactions.

A disadvantage of carrying the operating temperature to a higher level for the sake of increasing yield per pass is that the operating level is brought within the range wherein reactions involving splitting of carbon-carbon bonds take place rapidly. Since such reactions can result only in loss of C₄ hydrocarbons, the increased yield obtained per pass is accompanied by a decrease in the ultimate or recycle yield. Reduction of the contact time to decrease the cracking reactions does not offer a solution to this problem, since the dehydrogenation reaction is proportionately reduced and the ultimate yield is not thereby increased. In addition to the difficulties caused by these losses, the deposition of carbon on the catalyst is considerable, resulting in a rapid decrease in activity of the catalyst and the necessity of frequent regeneration, and often in operating difficulties due to building up of pressure within the catalyst chambers. Increased temperature also increases the rate of reaction by which the butenes formed are polymerized and so lost as heavy oils.

On the other hand, in the dehydrogenation of butene-1 to butadiene, the equilibrium values at various temperature levels are lower for the dehydrogenated product than are the equilibrium values for the olefin in the paraffin-olefin conversion. We have found that, it is necessary for this reason, to conduct the second dehydrogenation at a relatively higher temperature level compared to the first step in order to achieve economically practicable conversions. We have further discovered that the losses due to accompanying decomposition reactions are less in this second step than in the first step due to greater thermal stability of the butene, a factor which increases the economic advantage of higher temperature operation in this step.

In view of the different temperature levels which we have found necessary in the two dehydrogenation steps of our process, we have determined that best results may be obtained by the separation of a suitable charge stock for each step, and the use of a catalyst in each operation which is peculiarly suited to the operating conditions. Thus, we prefer to first dehydrogenate n-butane or a suitable C₄ hydrocarbon stock to produce butenes over an extremely active catalyst at the lowest temperature permitted by the characteristics of said catalyst. The products of the first dehydrogenation are then fractionated to obtain a fraction comprising butene-1 with negligible amounts of butene-2 and n-butane as disclosed in our co-pending application, Serial No. 352,786, filed August 15, 1940. This butene-1 fraction is then charged to our second dehydrogenation step wherein we use a catalyst less active than that used in the first step in order that we may operate in a higher temperature range with satisfactory catalyst life and optimum yields of butadiene.

We have now found that a very advantageous process for synthesizing butadiene from butane comprises the dehydrogenation of butane to butene at a relatively low temperature over a satisfactorily active catalyst in said relatively low temperature range comprising a combination of chromium oxide and bauxite, followed by separation of the butene-1 formed and further dehydrogenation of it to butadiene over a catalyst of satisfactory activity at a relatively high temperature. By the use of the very active chromium oxide-bauxite catalyst we have found it possible to achieve practically equilibrium dehydrogenation in the first stage and thus are enabled to use temperatures at which decomposition reactions are minimized. The necessarily higher temperatures employed in the second stage may be attained without undue decomposition, using low partial pressure of olefin over bauxite catalyst, which by reason of relatively lower but longer maintained activity gives sufficiently close to equilibrium concentrations of butadiene to enable us to achieve a practical yield per pass.

In its broader aspects, the invention lies in the use in the first step of the peculiar combination or intimate mixture of a highly adsorbent material such as bauxite with a metallic oxide, such as chromium oxide, which exerts a strong dehydrogenating activity on hydrocarbons, which combination or mixture is used as a contact catalyst for specifically removing hydrogen from paraffins to form mono-olefins at temperatures in the range of 950–1100° F.; and in the combination of this highly efficient, low temperature operation with the high temperatures dehydrogenation of the butene-1 produced in the first step over bauxite at temperatures in the range of 1100–1300° F.

If we use the $C_4$ fraction from refinery cracked gas instead of n-butane in our process, the steps of our invention are not materially altered. In such a fraction comprising n-butane and butenes, the butene concentration usually is not great enough to justify preliminary fractionation for the segregation of butene-1, and the entire stock is then dehydrogenated by the first step of our process to produce additional butenes prior to the separation of the butene-1 fraction. Obviously, if such a $C_4$ fraction is rich enough in butenes to approximate or exceed the butene content resulting from the initial dehydrogenation step we may first separate butene-1 by fractional distillation, and then return the butene-2 and n-butane as charge to the initial dehydrogenation operation.

In order that the invention may be more clearly understood, reference will be made to the accompanying drawing which is a diagrammatic representation of one form of apparatus in which the process of this invention may conveniently be carried out.

In the drawing, the raw n-butane or suitable $C_4$ hydrocarbon feed comprising n-butane and butenes enters by line 21 into heater 1 where the feed stream is raised to the desired temperature. The hot vapors then pass by line 22 into catalyst cases 2. These cases contain a catalyst composed of bauxite impregnated with chromium oxide capable of effecting the desired degree of dehydrogenation of n-butane to yield butenes. From catalyst cases 2, the treated vapors pass with some cooling (not shown) through line 23 into polymer separator 3 where small amounts of heavy material are removed by line 24. From separator 3 the vapors pass with required compression and/or cooling (not shown) into fractionating column 4. In column 4 a fractionation is effected to remove hydrogen and $C_3$ and lighter hydrocarbons overhead while the $C_4$ hydrocarbons constitute the bottoms fraction. The overhead fraction leaving by line 26 may be sent to further processing units through valve 27, or a portion may be returned by line 28 into the raw butane stream ahead of the heater providing the quantity of hydrogen gas thus returned is not allowed to pyramid in a fashion unfavorable to the dehydrogenation reaction. The $C_4$ fraction leaves column 4 by line 29 and is passed to fractionating column 5 wherein a fractional distillation is carried out to take butene-1 and butadiene overhead, while butene-2 and n-butane are removed from the kettle by line 31 and recycled to the raw feed stream ahead of the heater. The butene-1 fraction is collected in storage tank 6. The auxiliary equipment for columns 4 and 5, including heat exchangers, condensers, reflux accumulators and the like is familiar to the art, and thus is not shown in this flow diagram.

From storage 6, the butene-1 concentrate passes by line 32 into a heater 7, where the stream is heated to the temperature required for the second dehydrogenation operation. The heated vapors pass by line 33 to catalyst cases 8 containing bauxite catalyst. The treated vapors exit through line 34 with some cooling, and into polymer separator 9, wherein small amounts of heavy material are removed through line 35. From separator 9, the stream passes through line 36 into fractionating column 10 after suitable compression and cooling (not shown). In column 10, hydrogen and hydrocarbons including propane and lighter are removed overhead through line 37, while $C_4$ hydrocarbons constitute the kettle product. The overhead product from 10 may be passed to further processing units through valve 38, or optionally a portion or a component thereof may be sent through line 39 to the feed stream ahead of heater 7 to serve as a diluent. In the latter operation, the quantity of hydrogen gas recycled is regulated so as not to influence the reaction unfavorably. The $C_4$ fraction from column 10 passes through line 40 to the butadiene extractor 11 where butadiene is removed by suitable reagents. The unconverted mono-olefin leaves the extractor through line 41 and is recycled to the second dehydrogenation step into line 32 ahead of the heater 7. The butadiene in combination with the extracting medium is taken through line 42 to a suitable desorbing or recovery unit (not shown).

In one specific embodiment of this invention, the catalyst for the first step is prepared by impregnating dehydrated bauxite with a solution of a soluble chromium salt such as the nitrate. The chromium salt, in a rather concentrated solution, is merely sprayed as a mist onto the dehydrated bauxite which completely adsorbs it and immediately appears dry. The chromium nitrate is subsequently reduced to the oxide form by passing hydrogen or other reducing gas over the impregnated bauxite at elevated temperature.

It is recognized that chromium oxide has dehydrogenating properties, but such catalysts are generally very susceptible to sintering at temperatures of 950 or 1000° F. and above, and also are quite susceptible to sulfur poisoning. We believe that the excellent results obtained with the bauxite-chromium oxide catalyst are due to the fact that the chromium oxide, supported or distributed on the bauxite in this way is resistant to sintering at temperatures up to about 1100° F., and therefore in the range up to 1100° F. still has a large and highly active catalytic surface. The chromium oxide in this catalyst is also resistant to sulfur poisoning, which in some cases may also contribute largely to the success of the process.

Instead of the bauxite-chromium nitrate preparation a very satisfactory catalytic material may be made by impregnating bauxite with a concentrated solution of ammonium dichromate. The material may then be heated to the temperature at which the ammonium dichromate decomposes slowly to chromium oxide. Other chromium salts readily convertible to the oxide may, of course, be employed. Or, subsequent to impregnation with a chromium salt, the bauxite may be treated with a solution of sodium hydroxide, ammonium hydroxide, or other alkaline solutions, to precipitate the chromium as the insoluble hydroxide. The sodium or ammonium nitrate or other salt formed as a result of the interaction may then be completely removed by washing, and the chromium hydroxide subsequently decomposed to the oxide by heating.

Catalytic materials containing various percentages of chromium oxide may, of course, be prepared according to the above specifications. A material which is normally satisfactory for the dehydrogenation of butane consists of 95 per cent by weight of bauxite and 5 per cent chromium oxide. Smaller or larger percentages of chromium oxide may obviously be used, but the range of composition of catalysts having satisfactory activity is normally from one to ten per cent of chromium oxide.

Diaspore, certain commercial aluminas, or especially prepared aluminas may be used instead of bauxite in the preparation of these catalytic materials. These materials, though more expensive than bauxite, when used for this purpose frequently make much less effective catalytic materials than the naturally occurring mineral. We attribute this difference to the superior physical and chemical structure of bauxite. In utilizing catalysts of the present type, they may be employed alone, or admixed with inert siliceous spacing materials.

When operating the first dehydrogenation step of our process with bauxite-chromium oxide catalyst temperatures of 850 to 1100° F. may be used in the catalyst cases. We prefer to employ temperature in the range 950 to 1050° F. since temperatures below 950° F. yield too low conversions of normal butane even at equilibrium, while temperatures above 1050° F. cause relatively rapid deactivation of the catalyst to take place. A temperature of about 1025 to 1050° F. is often most suitable. Space velocities at which equilibrium conversion can be attained at these temperatures vary between 500 and 5000 volumes per hour, depending on various factors, such as catalyst activity, chromium content, and the like. We may operate this dehydrogenation at essentially atmospheric pressure, or at somewhat elevated pressure, up to a maximum of two to three hundred pounds per square inch. The mechanical operation of the dehydrogenation will differ, depending upon the operating pressure, and the equipment necessary in each case.

In the operation of the first dehydrogenation step, the hydrocarbon vapors may be subjected to two or more successive treatments with the bauxite-chromium oxide catalyst in a series of catalyst chambers, or the vapors or any fraction thereof may be recycled with the fresh feed vapors through the catalyst chamber. This may be accomplished, if desired, by splitting the stream of hot treated vapors leaving the catalyst chamber with one part passing to a compressor or its equivalent wherein the pressure is raised enough to force the recycled vapors into the stream of heated vapors prior to passage into the catalyst chamber. Also, some additional heat may be supplied to the recycled vapors if desired.

In carrying out the dehydrogenation of butene-1 to butadiene, temperatures between about 1100 and 1300° F. are employed. The partial pressure of butenes should be kept low to suppress undesirable side reactions, usually within the range 0.1 to 0.5 atmosphere. This may be accomplished by vacuum operation, or by dilution with an inert gas, which is a particularly useful operation in this stage.

The dehydrogenated vapors from the second step are stripped of butadiene in a concentrating operation which may employ any conventional method, such as chemical separation by absorption in solvents, cuprous halide solutions or others, or reaction with sulfur dioxide, or other physical methods. The butadiene so concentrated may be stored, while the remaining gas stream consisting of butenes is recycled to the dehydrogenating catalyst, or it may be wholly or in part used for other purposes as operating conditions dictate. The diluent gas is ordinarily recycled, with or without prior separation from the recycled butenes.

The following example will serve to further illustrate the nature of this invention.

Example

A catalyst comprising 6–14 mesh calcined bauxite impreganted with five per cent chromium oxide was used for conversion of butane to butylenes.

Normal butane was charged to the system diagrammed in the drawing, at a pressure of 30 pounds per square inch gage. The butane was heated to 1025° F. in the heater and passed through the catalyst cases at a space velocity of 1000 gas volumes (STP) per hour per volume of catalyst. Conversion to butenes was about 21 per cent of the butane charged. The effluent vapors were separated by two consecutive highly efficient fractionating columns. Light gases equivalent to three per cent of the charge were separated overhead in the first column. The temperature in the cases was maintained in the range of 1025° F. by introduction of the heat necessary for the endothermic reaction. Butene-1 was removed overhead in the second column and butene-2 and butane in the bottom fraction were returned to the dehydrogenation step with added fresh butane. Further butene-1 was produced by isomerization of the butene-2, so that in the steady state which was very soon established, butene-1 equivalent to 18 per cent of the total charge to the heater was separated in each pass. This is equivalent to a yield of about 86 per cent of the butane charged.

The test was continued for 24 hours, when the catalyst activity had declined sufficiently to indicate regeneration as desirable. During this time, temperature was gradually increased to 1075° F. to maintain conversion at a constant level.

The butene-1 produced was charged to the second dehydrogenation stage indicated in the drawing. Three volumes of substantially inert gas were added as a diluent. The charge was heated to 1175° F. and processed over bauxite catalyst at a space velocity of 1400 volumes per hour. On cooling, light gases equivalent to 16 per cent of the butene were separated, the inert diluent was recycled and the $C_4$ fraction was treated for separation of butadiene. An average of 16 per cent butadiene was separated and the remaining butene recycled.

During the test the temperature was gradually increased to 1225° F. to maintain conversion at a high level. After six hours activity of the catalyst had declined to a point at which regeneration was advisable.

We claim:

1. A process for producing butadiene from n-butane which comprises continuously passing n-butane over a bauxite-metallic oxide dehydrogenation catalyst of relatively high catalytic activity at temperatures within the range of 950–1100° F. in a first dehydrogenation step to produce olefins comprising butene-1 and butene-2, separating butene-2 and unconverted butane from the effluents of the first dehydrogenation step, recycling the butene-2 and butane to the first dehydrogenation step for isomerization of the butene-2 to butene-1 and conversion of the butane to olefins, separating butene-1 from the effluents of the first dehydrogenation step, and passing the butene-1 over a less active bauxite dehydrogenation catalyst at temperatures within the range of 1100–1300° F. in a second dehydrogenation step for conversion of butene-1 to butadiene.

2. A process for preparing butadiene from n-butane which comprises continuously passing n-butane over a catalyst of relatively high catalytic activity consisting of a major portion of bauxite and a minor portion of chromium oxide at temperatures within the range of 950–1100° F. and at substantially atmospheric pressure in a first dehydrogenation step to produce olefins comprising butene-1 and butene-2, separating the butene-2 and unconverted butane from the effluents of the dehydrogenation step, recycling the butene-2 and butane to the first dehydrogenation step for isomerization of the butene-2 to butene-1 and conversion of the butane to olefins, separating butene-1 from the effluents of the first dehydrogenation step, and passing the butene-1 together with inert gas in such proportions that the partial pressure of butene-1 is less than 0.5 atmosphere over a catalyst of relatively low catalytic activity consisting essentially of bauxite at temperatures within the range of 1100–1300° F. at a pressure of about one atmosphere for conversion of the butene-1 to butadiene.

WALTER A. SCHULZE.
JOHN C. HILLYER.